United States Patent [19]

Deeba et al.

[11] Patent Number: 5,145,825

[45] Date of Patent: Sep. 8, 1992

[54] OXIDATION CATALYST RESISTANT TO SULFATION

[75] Inventors: Michel Deeba, North Brunswick; James M. Chen, Edison; Yiu K. Lui, Parlin; Barry K. Speronello, Belle Mead, all of N.J.

[73] Assignee: Engelhard Corporation, Iselin, N.J.

[21] Appl. No.: 682,032

[22] Filed: Apr. 8, 1991

[51] Int. Cl.$^5$ ............................................. B01J 21/06
[52] U.S. Cl. .................................................. 502/242
[58] Field of Search ....................... 502/242; 423/244 R

[56] References Cited

U.S. PATENT DOCUMENTS

| | | | |
|---|---|---|---|
| 1,683,694 | 9/1928 | Patrick et al. | 423/536 |
| 2,200,522 | 5/1940 | Streicher | 22/234 |
| 2,364,949 | 12/1944 | Connolly | 502/242 |
| 2,408,396 | 10/1946 | Horsley | 252/239 |
| 2,708,187 | 5/1955 | Kearby | 252/442 |
| 3,067,127 | 12/1962 | Plank et al. | 208/110 |
| 3,068,169 | 12/1962 | Eastwood et al. | 208/134 |
| 3,159,569 | 12/1964 | Hansford | 208/110 |
| 3,615,166 | 10/1971 | Hindin | 23/2 E |
| 3,873,469 | 3/1975 | Foster et al. | 252/455 R |
| 3,894,965 | 7/1975 | Foster et al. | 252/460 |
| 4,039,478 | 8/1977 | Cull et al. | 252/455 R |
| 4,080,286 | 3/1978 | Yanik et al. | 208/216 |
| 4,171,289 | 10/1979 | Wheelock | 252/466 PT |
| 4,176,089 | 11/1979 | Cull | 252/452 |
| 4,178,270 | 12/1979 | Fujita et al. | 252/447 |
| 4,189,405 | 2/1980 | Knapton et al. | 502/242 |
| 4,191,733 | 3/1980 | Swift et al. | 423/245 |
| 4,221,768 | 9/1980 | Inoue et al. | 423/239 |
| 4,240,933 | 12/1980 | Copelin | 252/455 R |
| 4,292,288 | 9/1981 | Gladrow | 423/247 |
| 4,350,670 | 9/1982 | Matsuda et al. | 423/244 |
| 4,459,372 | 7/1984 | Arena | 502/351 |
| 4,465,889 | 8/1984 | Anthony et al. | 585/640 |
| 4,499,209 | 2/1985 | Hoek et al. | 518/707 |
| 4,537,873 | 8/1985 | Kato et al. | 502/242 |
| 4,751,005 | 6/1988 | Mitsui et al. | 210/759 |
| 4,759,918 | 7/1988 | Homeier et al. | 423/213.5 |
| 4,929,586 | 5/1990 | Hegedus et al. | 502/242 |
| 4,937,058 | 6/1990 | Dupin et al. | 423/224 |

FOREIGN PATENT DOCUMENTS

| | | | |
|---|---|---|---|
| 257983 | 3/1988 | European Pat. Off. | 502/242 |
| 2416753 | 10/1975 | Fed. Rep. of Germany | 502/242 |

*Primary Examiner*—Carl F. Dees
*Attorney, Agent, or Firm*—Inez L. Moselle

[57] ABSTRACT

A sulfur-resistant CO, hydrocarbon and $SO_x$ oxidation catalyst is provided comprising silica particles which have been coated with titania or zirconia or precursors thereof and which have deposited thereon a precious metal such as platinum. The coated silica catalyst can be included in a washcoat for application to a ceramic honeycomb carrier.

14 Claims, 3 Drawing Sheets

OXIDATION CATALYST RESISTANT TO SULFATION

BACKGROUND OF THE INVENTION

The present invention relates to an oxidation catalyst which is resistant to sulfur oxides. In particular, the present invention is directed to an oxidation catalyst useful in purifying exhaust and waste gases and, more specifically, to an oxidation catalyst capable of converting carbon monoxide and hydrocarbons to carbon dioxide and water with high efficiency even in the presence of sulfur oxides.

The present invention also relates to a process for converting carbon monoxide and hydrocarbons such as contained in exhaust or waste gas streams to carbon dioxide and water even when the exhaust or waste gas streams contain sulfur oxide components. The invention is also directed to a process for converting sulfur dioxide to sulfur trioxide using the novel sulfur-resistant oxidation catalyst of the present invention.

Hydrocarbon and CO abatement in various waste and exhaust gas streams may be accomplished by reacting the waste or exhaust gas with air over a platinum-containing catalyst. Typically used at present is a catalyst similar to the auto-exhaust catalyst which is comprised of platinum supported on alumina supports or alumina-containing supports which are often deposited over a ceramic honeycomb. Such catalysts are effective oxidation catalysts and deactivation of such catalysts are minimal when the waste or exhaust gas is devoid of sulfur oxides, to be referred to as $SO_x$, including $SO_2$. However, the exhaust and waste gases of many industrial operating systems including those cogenerating electricity and steam which are powered with diesel fuel or refining gas often contain up to a few hundred parts per million of $SO_2$. Under reaction conditions, $SO_2$ oxidizes to $SO_3$ which in turn reacts with alumina to form aluminum sulfate and, thus, renders the alumina-containing oxidation catalysts inactive.

It is known to use oxidation catalysts which contain catalytic metals on refractory oxide supports other than alumina. Thus, supports comprising silica, titania, zirconia and mixtures of these oxides are known and such supports including the binary and ternary mixtures of the above oxides are known to be resistant to $SO_x$. Unfortunately, it is also known that it is difficult to anchor a precious metal such as platinum on a silica support. The weak interaction between silica and precious metals results in severe precious metal sintering at very moderate conditions drastically reducing the surface area and, thus, activity of the precious metal catalyst. Moreover, although titania and zirconia interact with precious metals to significantly reduce sintering of the precious metal, the high initial surface area of both zirconia and titania (anatase) is drastically reduced after calcination at 500° C. The loss in surface area of zirconia and titania at typical reactive oxidation conditions is unfavorable inasmuch as the loss in surface area results again in the sintering of the precious metal and deactivation of the catalyst.

Accordingly, it is an object of the present invention to provide an effective carbon monoxide oxidation catalyst.

It is another object of the present invention to provide an effective carbon monoxide oxidation catalyst which is stabilized against deactivation at the elevated temperatures of reaction.

It is another object of the present invention to provide an effective carbon monoxide oxidation catalyst which is stabilized against deactivation by the presence of $SO_x$.

It is a further object of the present invention to provide an effective oxidation catalyst which can effectively oxidize gaseous sulfur-containing compounds to $SO_2$, $SO_3$ or mixtures thereof.

Yet another object of the present invention is to utilize a sulfur-resistant carbon monoxide oxidation catalyst in a process for purifying waste and exhaust gas streams of hydrocarbons and carbon monoxide.

Yet still another object of the present invention is to provide a process for effectively oxidizing $SO_2$ to $SO_3$ in the presence of a stabilized oxidation catalyst.

SUMMARY OF THE INVENTION

In accordance with the present invention, an oxidation catalyst is provided which is resistant to deactivation by sulfur oxides and which is useful in the oxidation of carbon monoxide and hydrocarbons such as is present in waste and exhaust gas streams which further contain $SO_x$. The catalyst of this invention is also useful in oxidizing $SO_2$ to $SO_3$.

The catalyst of this invention comprises refractory silica particles which have been coated with titania, zirconia or mixtures thereof and upon which coated silica particles are contained a Group VIII precious metal including but not limited to platinum, palladium and rhodium. The coated particulate catalyst is then coated on a ceramic honeycomb support as a washcoat for use. An important feature of the invention is the coating of titania or zirconia on the refractory silica particles. In accordance with this invention, the titania and zirconia coating is achieved by adding a titanium or zirconium salt to coat and/or impregnate the silica particles, and calcining in air to convert the metal salt to the respective oxide. The precious metal is subsequently added to the coated silica by known means. Alternatively, the precious metal can be applied to silica particles which have been coated with titania or zirconia precursors, i.e., precipitated Ti or Zr salts, that will be converted to the respective oxides during calcination after the precious metal is applied or during use of the catalyst. It has been found that the coating of titania or zirconia stabilizes the silica against sintering and provides a surface where precious metal sintering is minimized. Moreover, it has been found the silica stabilizes the titania or zirconia coating against sintering at elevated temperatures. The washcoat of coated silica particles on the honeycomb is advantageous inasmuch as the precious metal is dispersed throughout the thickness of washcoat layer.

DETAILED DESCRIPTION OF THE INVENTION

Figure 1:
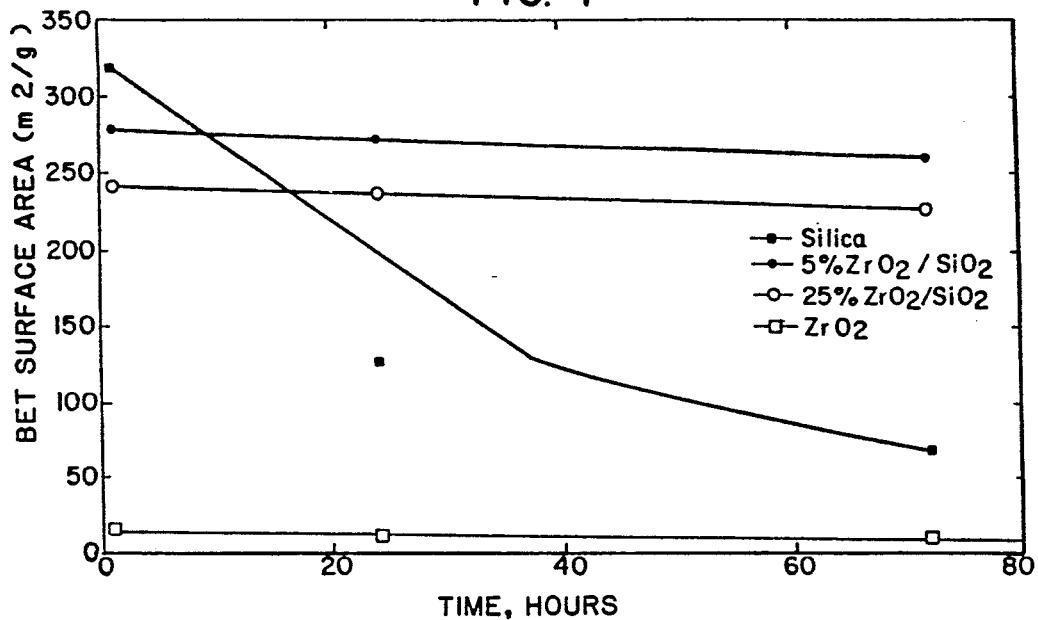
FIG. 1 is a graph illustrating the 800° C. heat-aged stability of silica, zirconia and mixtures thereof.

The oxidation catalyst of the present invention finds its preferred use in oxidizing carbon monoxide and hydrocarbons contained in exhaust and waste gas streams for conversion to $CO_2$ and water and wherein the waste and exhaust gas streams contain sulfur oxide compounds ($SO_x$). The catalyst of this invention is particularly useful in purifying exhaust gas from cogeneration units. In the catalyst of this invention, the alumina refractory base typically used in commercially available oxidation catalysts is replaced with silica which is stabilized by the addition of titania or zirconia to yield a base which can effectively anchor the precious metal component and is resistant to $SO_x$ degradation and deactivation. In view of the $SO_x$ resistance of the catalyst of this invention, the catalyst can also be used to oxidize gaseous sulfur-containing compounds to $SO_2$, $SO_3$ or mixtures thereof which has particular importance in various commercial applications involving the formation of sulfur-containing compounds including sulfuric acid and in the formation of various surface active agents. Moreover, oxidation of $SO_2$ to $SO_3$ is valuable in cleaning exhaust and waste gas streams of sulfur as the $SO_3$ is substantially easier to remove than $SO_2$.

The silica substrate is in the form of a refractory particulate having a sufficient surface area to be catalytically active, e.g. $>10$ m$^2$/g, and is stabilized by coating the refractory silica particulate with titanium or zirconium oxide or a mixture thereof. The starting materials for the zirconia and titania coating are preferably in the form of metal salts which are coated onto the particulate silica surface and which are then converted to the oxide by calcination in an $O_2$-containing gas such as air. Useful inorganic salts can include the chlorides, nitrates and sulfates of the respective metals. Organic acid salts such as the acetates, oxalates, etc. are also useful. Upon coating with the metal salt, the coated silica is calcined at a temperature typically above 500° C. Alternatively, the source for the zirconia and titania coating can be colloidal titania and zirconia. Further still, the silica particles can be slurried with a titanium or zirconium salt solution as described above and then treated to precipitate a titanium or zirconium oxide precursor salt onto the surface of the silica prior to the addition of the precious metal. The titanium and zirconium precursor salt can be converted to the oxide subsequent to the addition of the precious metal. In its broadest form, this further alternative method involves the addition of any titanium and zirconium compound which is a precursor for titania or zirconia and which corresponding oxide can be formed prior to precious metal addition, subsequent to precious metal addition and even during the use of the catalyst.

It is an important aspect of this invention that the titania and zirconia addition to the silica be in the form of a coating and/or impregnated into the silica. Thus, methods of forming mixed gels or co-precipitates of zirconia and/or titania with silica are not believed to be sufficient to provide the improvements in catalyst stability which have been found using the catalyst as prepared by the coating processes as above-described. Thus, methods of co-precipitating or co-gelling titania or zirconia with silica are not considered part of the present invention.

To provide the improved heat stability and resistance to $SO_x$ which has been found in the catalyst of this invention, the titania and zirconia should comprise greater than 5 wt. % of the stabilized silica. Coating weights of 10 to 25 wt. % are preferred to sufficiently provide the necessary stabilization. Coating weights above 25% are not believed to provide any substantial increase in stability although coating weights above 25% can be used as no detriment in catalyst stability or effectiveness is believed to occur at the higher coating loadings. Coating weights of greater than 5 wt. % to 25 wt. % correspond to 0.17 mg/m$^2$ of BET surface area to 0.83 mg/m$^2$ of BET surface area.

Subsequent to the formation of the titania or zirconia coating or precursor thereof on the silica particulate, the stabilized silica is coated with the precious metal component. Useful precious metals for the oxidation catalyst of this invention include platinum, palladium, ruthenium, iridium, rhodium, or a mixture thereof. The precious metal component can be added to the stabilized silica by an impregnation method, a kneading method or the like conventionally used method. A method of impregnation is preferred. It is preferable to add the precious metal component on the stabilized silica in an amount of from about 0.1 to 3% by weight based on the weight of the catalyst. As starting materials for the precious metal component, there can be used salts and complexes of precious metals such as chloroplatinic acid, platinum-amine complexes, as well as the chlorides and nitrates of the various precious metals.

The catalyst of this invention containing the precious metal dispersed upon the titania- or zirconia-stabilized silica particulate itself is applied as a layer or multiple layers of coated silica particles on a carrier such as a refractory honeycomb carrier. Thus, the catalyst is dispersed within a liquid wash coat which then impregnates the honeycomb carrier by methods well known in the art. This supported catalyst is preferred as the precious metal is highly dispersed throughout the washcoat and is not merely applied as a surface coating that is more readily damaged and deactivated. Alternatively, although not preferred, it is possible to apply the titania- or zirconia-stabilized silica as a wash coat on the honeycomb carrier and then subsequently impregnate the treated carrier with the precious metal component.

The coated particulate catalyst of this invention may also be molded such as by a tableting method, an extrusion method, a rolling granulated method and the like conventionally used method to form a catalyst having any desired shape such as cylinder, sheet, ribbing, corrugated sheet, donut, grid, etc. In such instances, if desired, the catalyst of this invention can be supported on well known carriers such as alumina, silica, silica-alumina, bentonite, diatomaceous earth, silicon carbide, titania, zirconia, magnesia, pumice and active carbon.

Figure 2:
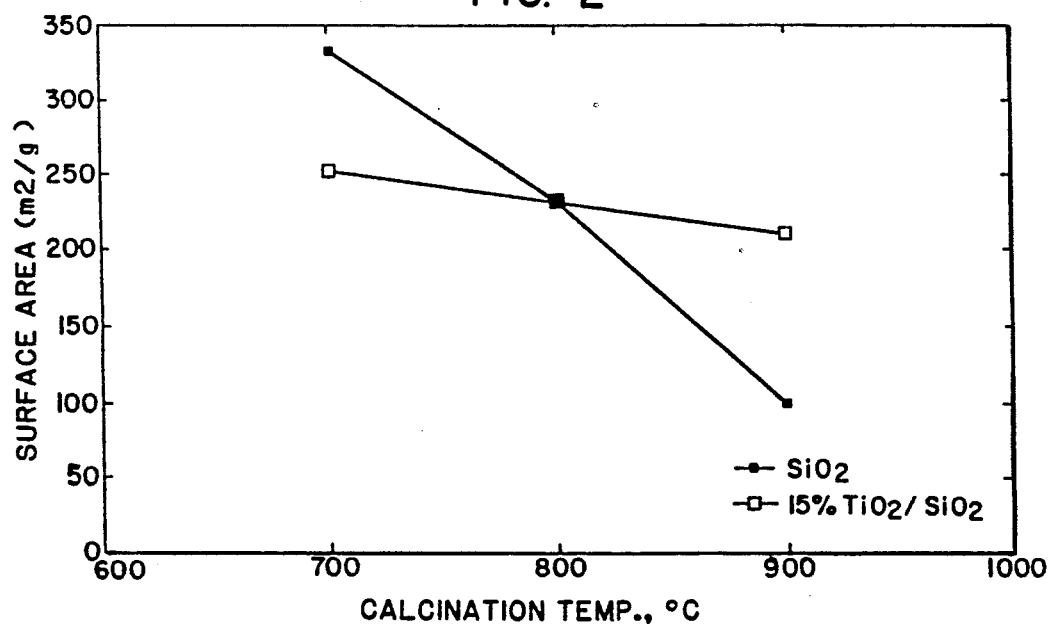
FIG. 2 is a graph illustrating the two hour heat-aged stability of silica relative to mixtures of titania and silica.

The stability of the present oxidation catalyst with respect to both elevated temperature and contact with $SO_x$ has been studied experimentally. While exact theories as to how the improvements in stability have occurred cannot be presented, empirical comparative results may be illuminating. Thus, it has been found that the addition of $ZrO_2$ or $TiO_2$ to silica has a pronounced positive effect on stabilizing the $SiO_2$ against sintering. FIG. 1 shows that the addition of 5% $ZrO_2$ to a silica surface resulted in a highly heat stable support. Thus, the surface area of the $ZrO_2/SiO_2$ (% $ZrO_2$=5-25%)

remained almost unchanged after calcination for several days at 800° C. Similar stabilization of silica was also found upon a TiO$_2$ addition as shown in FIG. 2. As further shown in FIG. 1, pure silica, on the other hand, lost more than 60% of its surface area after 24 hours at 800° C.

An important characteristic that differentiates the TiO$_2$- and ZrO$_2$- stabilized silica prepared by this invention vs binary titania- and zirconia-silica compounds is the stabilization of the ZrO$_2$ and TiO$_2$ phases by the silica in the catalysts of this invention. The precise nature of the interaction between ZrO$_2$ or TiO$_2$ and silica leading to stabilization is not clear, however, an interesting observation of the ZrO$_2$ and TiO$_2$ structure has been noted. X-ray diffraction (XRD) of ZrO$_2$/SiO$_2$ base as prepared by this invention shows that the zirconia produced on the silica surface yielded a diffraction pattern which matched tetragonal zirconia (beta zirconia). The beta phase is usually formed by calcining pure zirconia at temperatures of 1000° C. or higher compared to monoclinic zirconia (baddeleyite) which is formed at lower temperatures. Stabilization of the zirconia by silica assures that the silica will remain covered with ZrO$_2$, thus, minimizing the interaction of the precious metal such as platinum with the silica base. In the catalyst of this invention, lower ZrO$_2$ loadings of 5 wt. % were believed to be crystalline even though no XRD pattern was observed. Typically, a diffraction pattern of zirconia will only be observed if the ZrO$_2$ crystallites are in excess of 40 A and, thus, smaller crystallites are beyond detection. Accordingly, it is believed that the zirconia at the low 5 wt % level was highly dispersed with crystallites smaller than 40 A. Binary zirconia-silica made by coprecipitation or cogellation have no XRD pattern and have much of the surface consisting of exposed silica. Exposed silica acts as a poor support for precious metals resulting in severe catalyst deactivation by precious metal sintering.

Similar observations have been found for titania-stabilized silica formed in accordance with the present invention. Titania (TiO$_2$) in the anatase phase is stable at temperatures less than 500° C. Surprisingly, it has been found that TiO$_2$ supported on SiO$_2$ was present in the anatase phase even after calcination in air at 900° C. for several hours. The average titania crystallite size, measured by XRD, remained less than 40 A after calcination at 500° C. This clearly indicates that the titania, in the anatase phase, is highly dispersed and stabilized by the silica. It is interesting to note that the anatase titania is the least stable titania phase. On the contrary, a binary titania-silica prepared from a cogel, with similar chemical composition, was completely amorphous with no titania XRD pattern.

The function of highly dispersed zirconia or titania coating on the silica is to anchor the precious metal. This minimizes precious metal sintering and, thus, allows the catalyst to retain high activity at reaction conditions. Silica is a neutral support for precious metals deposition. The weak interaction between SiO$_2$ and precious metal results in severe precious metal sintering at very moderate conditions. On the contrary, TiO$_2$ and ZrO$_2$ interact with precious metals to significantly reduce precious metal sintering. A major problem, however, in using zirconia or titania as a sole support for precious metals is the loss in support surface area at reaction conditions. Both zirconia and titania (Anatase) have a high initial surface area (100–150 m$^2$/g), but surface area decreases significantly after calcination at 500° C. The loss in surface area of zirconia or titania at reaction conditions, is unfavorable since such loss results in precious metal sintering.

Figure 3:
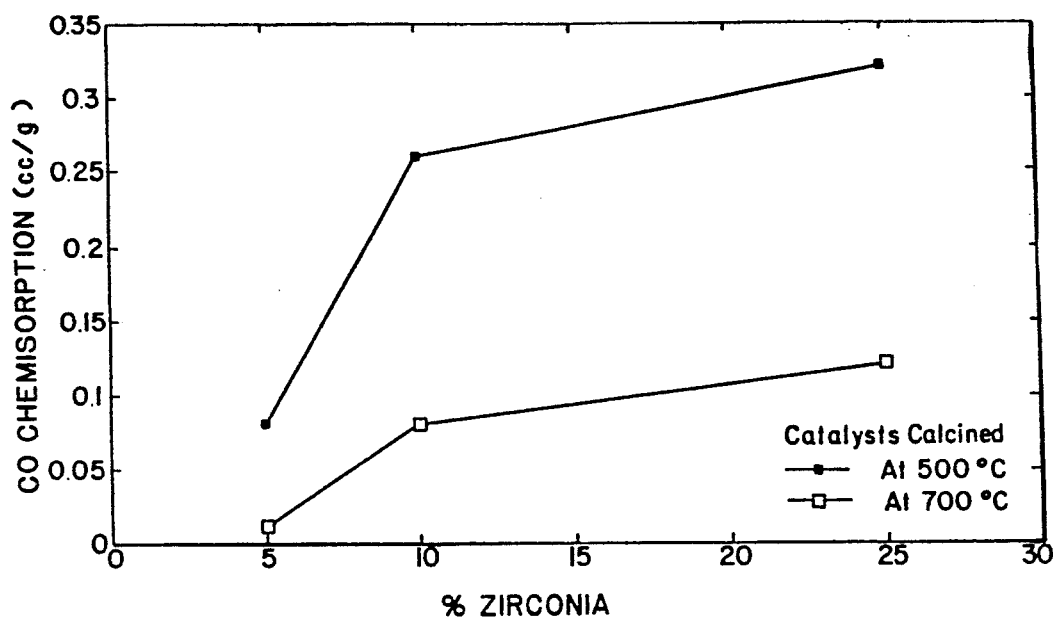
FIG. 3 is a graph illustrating the 2% platinum dispersion on the catalyst of this invention relative to the amount of zirconia added to the silica support.

Therefore, covering the silica particulate with stable metal oxides such as ZrO$_2$ or TiO$_2$, using the preparation procedure as described above with respect to the present invention is very favorable relative to reducing precious metal sintering. Covering the silica surface with ZrO$_2$ or TiO$_2$ is therefore essential for higher precious metal dispersion and superior catalytic performance. The extent of the silica surface covered depends primarily on the preparation procedure as well as on the amount of TiO$_2$ or ZrO$_2$ used. From CO chemisorption experiments, a measure of Pt dispersion, on a 2% Pt/ZrO$_2$/SiO$_2$ with varying amounts of ZrO$_2$, it was concluded that the Pt dispersion increased significantly as the ZrO$_2$ level was increased from 5 to 10% by weight (FIG. 3). An increase in Pt dispersion was observed, but to a lesser extent, as the ZrO$_2$ level was increased between 10 and 25%. At the 25% level of ZrO$_2$, the silica surface was covered with zirconia, consequently, the Pt would have substantially been in contact with zirconia and not silica. This resulted in effective dispersion of the Pt after calcination at 500° C. for several hours. On the contrary, a binary support would have most of the silica exposed which would result in much Pt being anchored to silica. Pt anchored to a silica support always leads to sintering and loss in metal dispersion even at temperatures as low as 350°–400° C. This is a considerably lower temperature than required to carry out many chemical reactions. Pt anchored on a zirconia-stabilized silica support, as per this invention, retains small Pt crystallites even after calcination in air at 700° C.

Similar results were also observed from the titania-stabilized silica catalyst (2% Pt/TiO$_2$/SiO$_2$) with TiO$_2$ level at 15 and 30%. XRD pattern showed that the TiO$_2$ remained in the anatase phase with crystallites less than 60 A even after calcination at 700° C. which indicates that TiO$_2$ remained highly dispersed. The Pt crystallites on the 30% TiO$_2$/SiO$_2$ support, after calcination at 500° C., were smaller than the detectability limit of the XRD, indicating high dispersion, see Table 1. The Pt crystallites on the 15% TiO$_2$/SiO$_2$ support, calcined to similar conditions (500° C.), were measured at 50 A which is still considerably well dispersed. Similar results were observed from CO chemisorption measurements as indicated in Table 1. Table 1 shows higher Pt dispersion with increase in TiO$_2$ (0–30%) coverage of the SiO$_2$ surface. The results clearly indicate that higher coverage of the silica surface with TiO$_2$ or ZrO$_2$ is more favorable for better precious metal dispersion.

TABLE 1

| Catalyst | Calc. T | CO Uptake (cc/g) | Pt Cryst. (XRD, A) | TiO$_2$ Cryst. (XRD, A) |
|---|---|---|---|---|
| A | 500 | .07 | 150 | NA |
| B | 500 | .41 | 53 | * |
| C | 500 | .94 | * | 30 |

Figure 4:
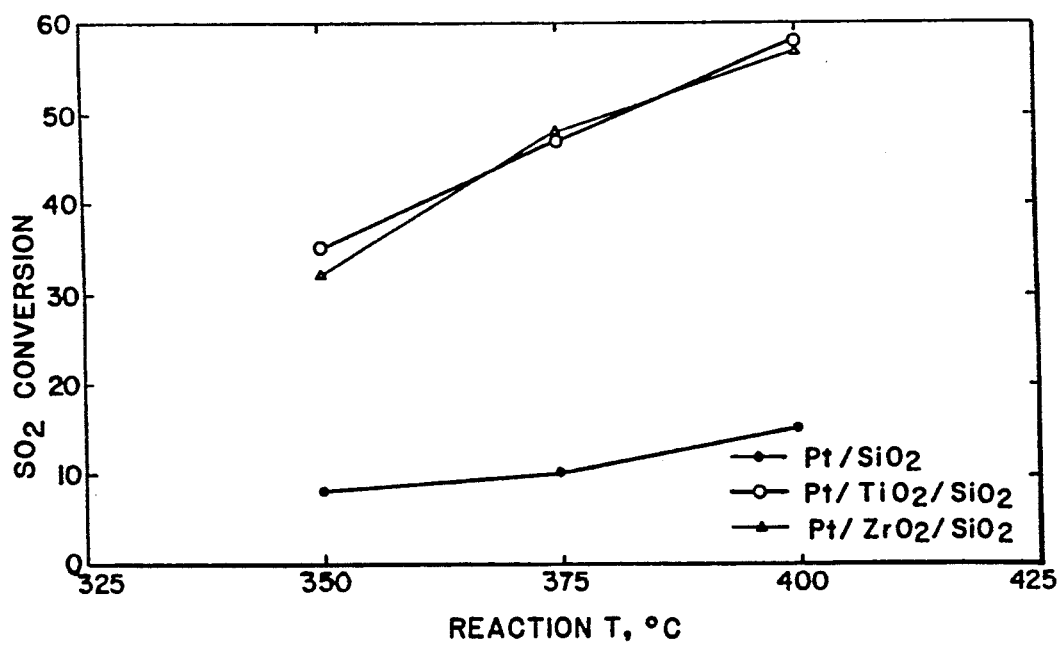
FIG. 4 is a graph comparing $SO_2$ oxidation using the catalysts of this invention relative to a catalyst comprising 2% $Pt/SiO_2$.

Catalyst A = 2% Pt/SiO2
Catalyst B = 2% Pt/15% TiO$_2$/SiO$_2$
Catalyst C = 2% Pt/30% TiO2/SiO$_2$
CO Uptake is a measure of exposed Pt surface. Higher numbers indicate higher dispersion.
NA = Not applicable and
* = Below detection limits The higher Pt dispersion on the zirconia- and titania-stabilized silica, prepared according to the present invention, also resulted in higher SO$_2$ conversion in the $SO_2$ oxidation reaction. Conversion of $SO_2$ over 2 wt. % $Pt/SiO_2$ catalyst was initially very low and the catalyst activity became nil in a short time on stream. On the other hand, $SO_2$ conversion activity was considerably increased using a 2 wt. % Pt catalyst (FIG. 4) due to addition of 25 wt. % $ZrO_2$ or 25 wt. % $TiO_2$ to the $SiO_2$ surface.

The following examples further illustrate the preparation and use of the catalyst of this invention. The Examples are to be construed as illustrative only and not for the purpose of limiting the scope of the invention to only the embodiments shown therein.

EXAMPLE 1

Preparation of $Pt/TiO_2/SiO_2$

A catalyst was prepared by adding 635 g of Tyzor LA (A titania compound from Dupont containing 14.2% $TiO_2$) to 410 g of silica particles (SYLOID 74 from Davison), mixing well for 1 hour followed by drying and calcination at 700° C. 54.3 g of Pt amine salt was diluted with water to make approximately 8 g of Pt solution. The $TiO_2/SiO_2$ was mixed with the Pt solution and the Pt fixed on the catalyst by addition of an acetic acid solution. Water was than added to make a 30% solid slurry and the slurry applied onto a honeycomb to give a final product of 38 g of Pt/cu. ft. The catalyst was dried and calcined at 500° C. This catalyst was identified as Catalyst A.

EXAMPLE 2

Preparation of $Pt/CeO_2/Al_2O_3$ $CeO_2/Al_2O_3$ was prepared by incipient wetness impregnation of a cerium nitrate solution onto $Al_2O_3$. The support was then dried and calcined at 700° C. for 2 hours. The preparation and deposition of the $Pt/CeO_2/Al_2O_3$ catalyst was similar to Example 1 and identified as Catalyst B. Catalyst B had a composition similar to Catalyst A given as 38 g of $Pt/Ft^3$. of the honeycomb.

EXAMPLE 3

Catalysts A and B were tested fresh (virgin) for CO oxidation at several temperatures. The CO concentration was 250 ppm with a Gas Hourly Space Velocity of 600,000 $hr^{-1}$. The results of the test are given in Table 2.

TABLE 2

| Catalyst | CO ppm | $SO_2$ ppm | Light Off T (°C.) | % CO Conv @ (°C.) 100 | 150 | 200 | 250 |
|---|---|---|---|---|---|---|---|
| Cat A | 250 | 0 | 120 | 45 | 58 | 65 | 70 |
| Cat B | 250 | 0 | 120 | 40 | 55 | 65 | 70 |

Light off temperature was measured as the minimum temperature required to give 50% CO conversion.

Table 2 clearly indicates that both catalysts tested fresh had similar activity. No difference in performance could be deduced when the catalysts were tested fresh in the absence of $SO_2$.

EXAMPLE 4

Catalysts A and B were tested for CO oxidation in the presence of 200 ppm of $SO_2$. This experiment mimicked cogeneration unit operation. The CO light off temperature as well as the CO conversion at several reaction temperatures is given in Table 3.

TABLE 3

| Catalyst | GHSV | CO ppm | $SO_2$ ppm | Light Off T (°C.) | % CO Conversion @ Temp. (°C.) 100 | 150 | 200 | 250 |
|---|---|---|---|---|---|---|---|---|
| A | 500,000 | 250 | 200 | 250 | 0 | 15 | 47 | 50 |
| B | 500,000 | 250 | 200 | >260 | 0 | 7 | 25 | 45 |

The non-alumina based support had lower light off temperature as well as higher CO conversion at all temperatures tested. This clearly indicates that in the presence of $SO_2$, the catalyst per this invention is more active than catalyst B in converting CO and is less susceptible to sulfation. Alumina based catalyst sulfates (forms aluminum sulfates) which results in catalyst deactivation.

EXAMPLE 5

Catalysts A and B were aged in $SO_2$/steam at 950° F. for 16 hours to determine the effect of sulfation on their performance. The catalyst were aged for 16 hours in 2% $SO_2$, 88% air, and 10% steam. The catalysts were then tested for CO oxidation in the absence of $SO_2$. The results in Table 4 clearly indicate that the $TiO_2/SiO_2$ based catalysts have higher tolerance for the $SO_2$/steam compared to that alumina supported catalyst.

TABLE 4

| Catalyst | CO ppm | Light Off Temp, °C. | % CO Conversion @ (°C.) 100 | 150 | 200 | 250 | 300 |
|---|---|---|---|---|---|---|---|
| A | 250 | 140 | 45 | 52 | 55 | 57 | 60 |
| B | 250 | 200 | 10 | 30 | 50 | 57 | 62 |

The CO conversion of the non-alumina based catalyst ($Pt/TiO_2/SiO_2$) resembled that of fresh catalyst. The poisoning effect of the $SO_2/SO_3$ on the alumina based catalyst seemed to be permanent. On the contrary, the $Pt/TiO_2/SiO_2$ recovered most of its activity after aging in the $SO_2$/air/steam atmosphere. This may be related to the acidic properties of the support that interacts weakly with the $SO_3$ formed during aging. On the other hand, alumina would sulfate and, thus, result in catalyst deactivation.

EXAMPLE 6

This was similar to Example 5 except that during testing $SO_2$ (200 ppm) were introduced with the CO feed. Results are given in Table 5.

TABLE 5

| Catalyst | CO ppm | $SO_2$ ppm | Light Off T | % CO Conversion @ (Temp °C.) 125 | 150 | 200 | 250 |
|---|---|---|---|---|---|---|---|
| A | 250 | 200 | 250 | 8 | 15 | 42 | 50 |
| B | 250 | 200 | 270 | 0 | 8 | 25 | 45 |

EXAMPLE 7

This example illustrates the synthesis procedure for 2% $Pt/25\%$ $ZrO_2/SiO_2$.

330 g of zirconyl nitrate was dissolved in 480 ml of hot water. 400 g of $SiO_2$ particles (SYLOID 74 from Davison) were mixed with the zirconyl nitrate solution for at least one hour to impregnate the silica. The mixture was dried at 120° C. for 16 hours and calcined at 880° C.

392 g of the 25% $ZrO_2/SiO_2$ support was mixed with 400 ml of Pt amine salt solution containing 8 g Pt (made by diluting 54.3 g of Pt amine salt (% Pt=14.73) solution with 400 ml of water). 40 ml of acetic acid were added during mixing for 2 hours. A slurry of this catalyst was prepared by mixing the wet cake catalyst above with 400 ml of water (solid content=33%). The slurry was ball milled for 19 hours and then applied to 200 cells/in$^2$ honeycomb (6×6×3 inches honeycomb) so that the finished coated honeycomb had a Pt pick-up of 41 g of Pt per ft$^3$.

Figure 5:
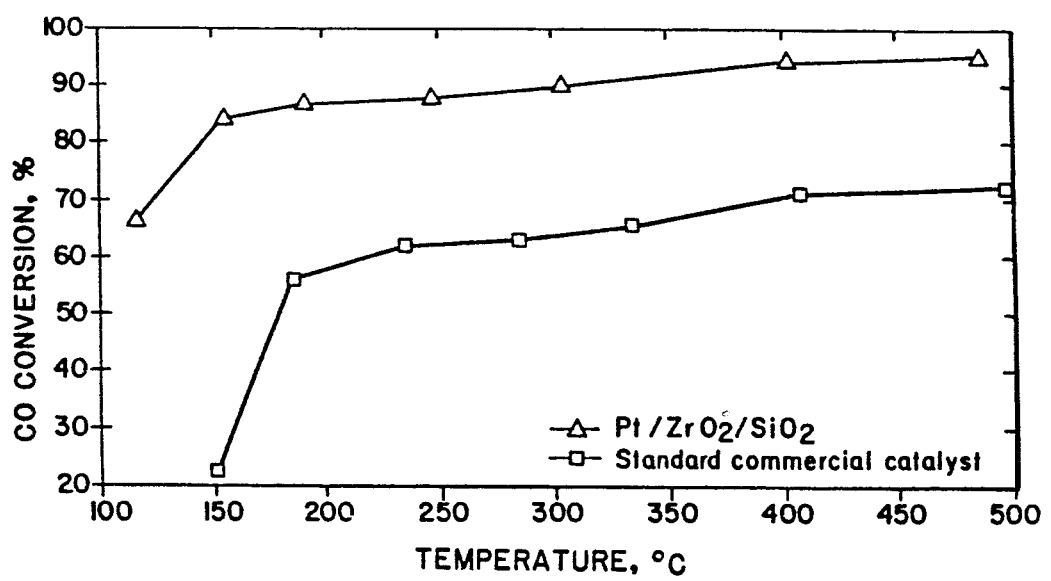
FIG. 5 is a graph illustrating the affectiveness of the catalyst of this invention in oxidizing CO upon aging of the catalyst with $SO_2$ compared to the effectiveness of a standard commercial catalyst.

FIG. 5 shows the CO conversion of the above catalyst after exposure to SO$_x$. The standard commercial catalyst used was catalyst B above. As can be seen, the catalyst of this invention had a substantially higher activity than the alumina-containing catalyst.

What is claimed is:

1. A sulfur-resistant oxidation catalyst comprising silica, a coating of titania or zirconia or a mixture thereof or precursors of said oxides on said silica and at least one precious metal supported on said coated silica.

2. The catalyst of claim 1 wherein said titania or zirconia coating is present in amounts of from at least 5 wt. % based on said coated silica.

3. The catalyst of claim 1 wherein said titania or zirconia coating is present in amounts of at least about 10 wt. % based on said coated silica.

4. The catalyst of claim 3 wherein said titania or zirconia coating is present in amounts of at least about 10 to about 25 wt. % based on said coated silica.

5. The catalyst of claims 1, 2 or 3 wherein said silica is in the form of a silica particle.

6. The catalyst of claim 5 wherein said titania or zirconia coating is applied as a titanium or zirconium salt which is calcined in an oxygen-containing gas to form the respective metal oxide.

7. The catalyst of claims 1, 2 or 3 wherein said titania or zirconia coating is applied as a titanium or zirconium salt which is calcined in an oxygen-containing gas to form the respective metal oxide.

8. The catalyst of claims 1 or 6 or wherein said precious metal is platinum.

9. A sulfur-resistant oxidation catalyst comprising a ceramic honeycomb coated with a catalytic washcoat containing particles of silica coated with titania or zirconia or a mixture thereof or a precursor of said oxides and at least one precious metal supported on said coated silica particles.

10. The catalyst of claim 9 wherein said titania or zirconia coating is present in amounts of from at least 5 wt. % based on said coated silica.

11. The catalyst of claim 9 wherein said titania or zirconia coating is present in amounts of at least about 10 wt. % based on said coated silica.

12. The catalyst of claim 11 wherein said titania or zirconia coating is present in amounts of at least about 10 to about 25 wt. % based on said coated silica.

13. The catalyst of claims 9, 10 or 11 wherein said titania and zirconia coating is applied as a titanium or zirconium salt which is calcined in an O$_2$-containing gas to form the respective metal oxide.

14. The catalyst of claim 13 wherein said precious metal is platinum.

* * * * *